United States Patent
Clowes

(10) Patent No.: US 10,280,558 B2
(45) Date of Patent: May 7, 2019

(54) METHODS AND APPARATUS FOR LASER CLEANING OF FABRIC MATERIALS

(71) Applicant: WOODROW SCIENTIFIC LTD., New Milton, Hampshire (GB)

(72) Inventor: John Redvers Clowes, New Milton (GB)

(73) Assignee: Woodrow Scientific Limited (GB)

( * ) Notice: Subject to any disclaimer, the term of this patent is extended or adjusted under 35 U.S.C. 154(b) by 225 days.

(21) Appl. No.: 14/589,695

(22) Filed: Jan. 5, 2015

(65) Prior Publication Data

US 2015/0218746 A1 Aug. 6, 2015

Related U.S. Application Data

(63) Continuation of application No. PCT/GB2013/000295, filed on Jul. 8, 2013.

(Continued)

(51) Int. Cl.
*D06F 75/00* (2006.01)
*D06F 75/02* (2006.01)
(Continued)

(52) U.S. Cl.
CPC ......... *D06M 10/005* (2013.01); *B08B 7/0042* (2013.01); *B23K 26/0006* (2013.01);
(Continued)

(58) Field of Classification Search
CPC combination set(s) only.
See application file for complete search history.

(56) References Cited

U.S. PATENT DOCUMENTS 3,906,187 A 2/1975 Turoczi, Jr.
5,766,266 A 6/1998 Ripley et al.
(Continued)

FOREIGN PATENT DOCUMENTS

CN 2885918 Y 11/2005
CN 1817549 A 8/2006
(Continued)

OTHER PUBLICATIONS

Machine translation: CN201058946Y; Wang et al.; May 14, 2008.*
(Continued)

*Primary Examiner* — Mikhail Kornakov
*Assistant Examiner* — Natasha N Campbbell
(74) *Attorney, Agent, or Firm* — Peter Rainville; Nicholas Tuccillo; Grogan, Tuccillo and Vanderleeden LLP

(57) ABSTRACT

Disclosed are methods and apparatus for cleaning a substrate, such as a fabric material, involving the application of optical energy to the substrate, typically in the form of a beam of light, where the energy of the beam causes removal of the contaminant from substrate, such as from the fibers of a fabric material. The cleaning may occur via any mechanism, including one or more of, alone or in any combination, ablation, melting, heating or reaction with the substrate or contaminant or agent introduced to aid in the cleaning. The optical energy is typically applied to a selected area of the substrate (e.g., as a beam), and the substrate and beam or optical energy source moved relative to one another so as to clean a larger area of the substrate, either by moving the substrate or the beam, or both. Movement of the beam with respect to the substrate can be attained through a beam scanning mechanism or through movement of the optical source itself.

20 Claims, 19 Drawing Sheets

US 10,280,558 B2

Page 2

Related U.S. Application Data

(60) Provisional application No. 61/670,114, filed on Jul. 10, 2012.

(51) Int. Cl.
| | |
|---|---|
| D06F 75/08 | (2006.01) |
| D06F 75/22 | (2006.01) |
| B08B 7/00 | (2006.01) |
| D06M 10/00 | (2006.01) |
| D06F 75/20 | (2006.01) |
| B23K 26/00 | (2014.01) |
| D06F 75/14 | (2006.01) |
| B23K 26/03 | (2006.01) |
| B23K 26/06 | (2014.01) |
| B23K 26/073 | (2006.01) |
| B23K 26/082 | (2014.01) |
| B23K 26/0622 | (2014.01) |
| D06L 4/00 | (2017.01) |
| B23K 26/354 | (2014.01) |
| B23K 26/352 | (2014.01) |
| B23K 101/34 | (2006.01) |
| B23K 103/00 | (2006.01) |

(52) U.S. Cl.
CPC ........ *B23K 26/0096* (2013.01); *B23K 26/032* (2013.01); *B23K 26/0622* (2015.10); *B23K 26/0648* (2013.01); *B23K 26/0738* (2013.01); *B23K 26/082* (2015.10); *B23K 26/352* (2015.10); *B23K 26/354* (2015.10); *D06F 75/00* (2013.01); *D06F 75/02* (2013.01); *D06F 75/08* (2013.01); *D06F 75/14* (2013.01); *D06F 75/20* (2013.01); *D06F 75/22* (2013.01); *D06L 4/00* (2017.01); *B23K 2101/34* (2018.08); *B23K 2103/38* (2018.08); *B23K 2103/40* (2018.08); *B23K 2103/42* (2018.08); *B23K 2103/50* (2018.08)

(56) References Cited

U.S. PATENT DOCUMENTS

| | | |
|---|---|---|
| D548,418 S | 8/2007 | Cahen |
| 7,257,911 B2 | 8/2007 | Voitchovsky |
| 7,562,474 B2 | 7/2009 | Voitchovsky |
| 8,099,882 B2 | 1/2012 | Voitchovsky |
| 2002/0029498 A1 | 3/2002 | Harrison |
| 2003/0121896 A1 | 7/2003 | Yu |
| 2004/0049955 A1 | 3/2004 | Denisart et al. |
| 2004/0172867 A1 | 9/2004 | Voitchovsky |
| 2005/0086847 A1* | 4/2005 | Paulkovich ............ F41B 9/00 42/114 |
| 2005/0278987 A1* | 12/2005 | Ching ................ D06F 75/08 38/77.5 |
| 2008/0276966 A1 | 11/2008 | Yusuf |
| 2010/0058624 A1 | 3/2010 | Voitchovsky |
| 2011/0049114 A1 | 3/2011 | Barkhausen et al. |
| 2011/0185604 A1 | 8/2011 | Voitchovsky |
| 2012/0053387 A1 | 3/2012 | Thro et al. |
| 2015/0225891 A1 | 1/2015 | Clowes |

FOREIGN PATENT DOCUMENTS

| | | |
|---|---|---|
| CN | 2877948 Y | 3/2007 |
| CN | 201058946 Y * | 5/2008 |
| CN | 201720218 U | 1/2011 |
| CN | 102159762 A | 6/2012 |
| DE | 19900910 A1 | 7/2000 |
| DE | 19944934 A | 6/2001 |
| DE | 10113494 A1 | 10/2002 |
| DE | 102004009687 A1 | 9/2005 |
| DE | 102007020748 A1 | 11/2008 |
| EP | 0750066 B1 | 11/2000 |
| EP | 1848852 B1 | 3/2011 |
| EP | 2452010 A2 | 5/2012 |
| EP | 2142333 B1 | 7/2014 |
| JP | 11043861 A | 2/1999 |
| JP | 2001269636 A | 10/2001 |
| JP | 2002301439 A | 10/2002 |
| JP | 2002343761 A | 11/2002 |
| JP | 2003193364 A | 7/2003 |
| KR | 100871451 B1 | 12/2008 |
| RO | 121547 B1 | 11/2007 |
| TW | I311646 B | 7/2009 |
| WO | 9930865 A1 | 6/1999 |
| WO | 02064874 A2 | 8/2002 |
| WO | 2004085921 A1 | 10/2004 |
| WO | 2005014917 A1 | 2/2005 |
| WO | 2006085285 A1 | 8/2006 |
| WO | 2008081352 A1 | 7/2008 |
| WO | 2008135455 A1 | 11/2008 |

OTHER PUBLICATIONS

Meg Abraham, Odile Madden, Stephanie Scheerer; The Use of Added Matrix Elements Such as Chemical Assistants, Colorants and Controlled Plasma Formation as Methods to Enhance Laser Conservation of Works of Art, Journal of Cultural Heritage 4, 2003, Elsevier.

Belli, R., Miotello, A., Mosaner, P. et al. Appl. Phys. A (2006) 83: 651. doi:10.1007/s00339-006-3530-3.

J. Krüger, et al.; Lasers in the Conservation of Artworks, Springer Proceedings in Physics, 2007, 1, 116, Springer Berlin Heidelberg.

Howard Sutcliffe, Martin Cooper, Janet Farnsworth; An Initial Investigation into the Cleaning of New and Naturally Aged Cotton Textiles Using Laser Radiation, Journal of Cultural Heritage, Aug. 1, 2000, 1.1, Elsevier Science.

Rule 161 Communication from the European Patent Office.

International Search Report, PCT/GB2015/050018, dated Jun. 26, 2015.

Written Opinion of the International Searching Authority, PCT/ISA/ 220, PCT/GB2015/050018, dated Jun. 26, 2015.

Machine translation of CN2885918: Yu, D.; 2007 (included with original patent document).

Machine translation: Santo et al.; JP11043861; 1999 (included with original patent document).

Machine translation: Oouchi, A.; JP 2003-193364; 2003 (included with original patent document).

Preliminary Amendment filed in U.S. Appl. No. 14/592,657, continuation of the present application.

Non Final Rejection issued in U.S. Appl. No. 14/592,657, continuation of the present application.

Response to Non Final Rejection filed in U.S. Appl. No. 14/592,657, continuation of the present application.

Final Rejection issued in U.S. Appl. No. 14/592,657, continuation of the present application.

International Search Report and Written Opinion of the International Searching Authority, PCT/GB2013/000295, dated Feb. 21, 2014.

European Examination Report, 'Communication Pursuant to Article 94(3) EPC', dated Jul. 11, 2017, in European Patent Application No. 13742257.2. (NOTE: Document D2, U.S. Pat. No. 5,766,266, referenced in the cited Examination Report, has previously been made of record in this case).

* cited by examiner

METHODS AND APPARATUS FOR LASER CLEANING OF FABRIC MATERIALS

FIELD OF THE INVENTION

The present invention relates to an apparatus and methods of cleaning substrates using optical energy. More particularly, the invention is concerned with using optical energy to clean fabric materials.

BACKGROUND

Conventional cleaning apparatus and processes typically utilise an aqueous method or a method which utilises chemicals. Consider, for example, household washing machines or dry cleaning, which is more commonly used within industrial cleaning processes.

Domestic cleaning of clothes or other fabric articles typically involves hand washing processes or more commonly front or top-loaded drum-style washing machines which employ both an aqueous and mechanical cleaning process, often requiring detergents and stain removal chemicals. Such machines have a high consumption of both water and power, with an average domestic washing machine using between 9-10 liters of water and consuming approximately 0.75 KW-hour electricity per wash load. Once the items are cleaned, the very nature of the cleaning process leaves the articles quite wet and requires subsequent drying, either in an inefficient machine such as a commercial tumble drier or through inefficient use of a building's heating system (radiators, etc.) or through outside drying via direct sunlight and/or wind.

Dry cleaning processes typically involve extensive use of hydrocarbon solvents such as perchloroethylene, and the storage, treatment and disposal of such chemicals may pose environment concerns. Furthermore, dry-cleaning equipment is specialist and is often extremely expensive and non-portable.

The cleaning of carpets and upholstery, both in the domestic as well as industrial environment, typical uses hot water or steam processes and, in many cases, these processes again leave the material soaked to dry out gradually over time. For industrial applications, for example in the transport sector where seats of passenger aircraft, trains and buses require regular cleaning, this can be involve periods of "down time" where the vehicle is not used so as to allow the cleaned upholstery to be dried.

In modern society, many articles being cleaned using conventional method and apparatus are very lightly or locally soiled. For example a shirt may have a dirty collar and cuffs and perhaps have an odour in certain regions of the shirt. Nevertheless, the item is fully washed simply because there is a small oil or food stain in a very localised area. In a household setting, the use of a washing machine to clean such items on a daily basis can be excessive, and can result in a degradation in the lifetime of the article due to the mechanical nature of the cleaning process and the need, very often, for drying of the garment in direct sunlight.

SUMMARY OF THE INVENTION

In consideration of one or more of the disadvantages with conventional cleaning methods and apparatus, the present inventor has devised novel processes and apparatus for cleaning substrates, such as substrates comprising fabric materials. One or more of the amount of water, steam and/or chemicals, as well as the electrical power, used within prior art methods can in many instance be significantly reduced.

In broad aspect, the invention provides methods and apparatus for cleaning a substrate, such as a fabric material, involving the application of optical energy to the substrate, typically in the form of a beam of light, where the energy of the beam causes removal of the contaminant from substrate, such as from the fibres of a fabric material. The cleaning may occur via any mechanism, including one or more of, alone or in any combination, ablation, melting, heating or reaction with the substrate or contaminant or agent introduced to aid in the cleaning. The optical energy is typically applied to a selected area of the substrate (e.g., as a beam), and the substrate and beam or optical energy source moved relative to one another so as to clean a larger area of the substrate, either by moving the substrate or the beam, or both. Movement of the beam with respect to the substrate can be attained through a beam scanning mechanism or through movement of the optical source itself.

By way of example and not limitation, Contaminants to be removed can be one or more (or any combination) of dirt particles, molecules and particles chemically bonded to textile fibres, bodily fluids, food stains and food substances, bacteria and odour-inducing particles and molecules or substances, oils, greases, biological materials, and nuclear particles. Contaminants can be organic or inorganic, or combinations of both organic and inorganic materials.

The optical energy is preferably delivered to the substrate as a beam. The beam of light can be divergent, providing a broad area of illumination or can be collimated or focused to a much more confined region of the substrate using appropriate beam shaping and/or focussing optics. The focused or collimated beam can be in any shape but would preferably be in the form of a spot or a stripe. The optical energy can be in the form of a narrow spectral band, several different narrow spectral bands, or can be broadband and comprise many wavelengths of light in a continuum spectrum (e.g., the source of optical energy can comprise a supercontinuum source). The optical energy can comprise a wavelength selected to remove a specific contaminant from a substrate. The source of optical energy can comprise a wavelength-filtered light source and can further allow for the selection of a particular wavelength to achieve optimized contaminant removal dependent on the contaminant and/or substrate make-up.

Methods and apparatus of the invention can, respectively, include steps or be adapted for assisting the removal of the contaminant from the substrate, such as helping extract the contaminant (e.g., via chemical action), blowing away the contaminant or providing an activation mechanism to the contaminant removal process. For example, water can be introduced to dampen the contaminated substrate, steam to provide heat, moisture or pressure to the cleaning process, vacuum or compressed air to provide removal of any removed contaminant particles through suction or by blowing the contaminant away from the substrate. Chemicals, including detergents, stain removers, and anti-oxidants, may provide a chemical reaction to assist the removal of the contaminant, such as from the fibres of a substrate comprising a fabric material. Methods and apparatus of the invention can, respectively, include steps or be adapted for sensing the speed of translation of the beam with respect to the substrate and controlling the speed and the optical energy delivered to prevent over exposure and damage of the substrate, as well ask, additionally or alternatively, interlocking the laser source such that it is made very difficult to operate the laser whilst potentially exposing the skin and/or eyes of the a user to the optical radiation. The type or nature of the substrate can be sensed as well as the rate of removal and type of removed contaminant, such that automated scanning and power delivery of the light beam can be incorporated into the methods or apparatus of the cleaning invention.

Although the invention is often described herein in term of the cleaning of substrates comprising fabric material, the invention can be broader in scope. The methods and apparatus described herein are considered suitable for the cleaning of a wide variety of substrates including, for example, paper, leather, plastics, glass, metals, paints, wood, cardboard and masonry.

More detailed aspects and embodiments are now described below. However, any of the features of the foregoing broad aspects, taken alone or in combination, can apply to any of the embodiments or aspects described herein, except where features are clearly mutually exclusive or explicitly stated to be incompatible.

In one aspect of the invention, a portable laser cleaning appliance can comprise an appliance body comprising an aperture for emanating optical energy for cleaning and an optical transmission pathway arranged for propagating optical energy received from an optical energy source to the aperture for emanation of the optical energy for the cleaning. The portable laser cleaning appliance can be adapted and constructed so as to be hand held and for cleaning a fabric material, including cleaning by emanating from the aperture the optical energy having one or more optical parameters selected so as to remove a selected contaminant from the fabric material. The portable laser cleaning appliance can include a work surface arranged such that the work surface is in physical contact with the fabric material during cleaning or, alternatively or additionally, the portable laser cleaning appliance can be arranged and constructed such that that the cleaning with the optical energy is blind as to the user holding the laser cleaning appliance in their hand for cleaning. As an alternative to the cleaning be blind as to the user, the appliance can include a viewing window that allows the user at least some visibility of the cleaning process, wherein the laser cleaning appliance filters a selected wavelength or wavelengths to reduce harmful exposure to a user of the portable laser cleaning appliance to the selected wavelength or wavelengths.

The portable laser cleaning appliance can include the work surface arranged such that the work surface is in physical contact with the fabric material during cleaning. The portable laser cleaning apparatus can be arranged and constructed such that that the cleaning with the optical energy is blind as to the user holding the laser cleaning appliance in their hand for cleaning. The portable laser cleaning appliance can be constructed and arranged so as to include a viewing window that allows the user at least some visibility of the cleaning process wherein the laser cleaning appliance filters a selected wavelength or wavelengths to reduce harmful exposure to a user of the portable laser cleaning appliance to the selected wavelength or wavelengths.

In certain aspects of the invention, the portable laser cleaning appliance can include the work surface arranged such that the work surface is in physical contact with the fabric material during cleaning and the cleaning is blind as to the user holding the laser cleaning appliance in their hand for cleaning. The portable laser cleaning appliance can include the work surface arranged such that the work surface is in physical contact with the fabric material during cleaning and can be constructed and arranged so as to include a viewing window that allows the user at least some visibility of the cleaning process wherein the laser cleaning appliance filters a selected wavelength or wavelengths to reduce harmful exposure to a user of the portable laser cleaning appliance to the selected wavelength or wavelengths.

In other aspects of invention, the work surface can substantially surround the aperture. The work surface can be adapted for contacting and surrounding the fabric material such that substantially no stray optical energy escapes from the cleaning process when the contact is maintained with the fabric material. The portable laser cleaning appliance can include a proximity sensor arrangement for providing control of the emanation of optical energy for cleaning from the aperture responsive to the proximity of the fabric material to the aperture. The portable laser cleaning apparatus can be adapted and constructed such that substantially no optical energy for cleaning emanates from the aperture unless selected physical contact is maintained between the surface and the fabric material.

In further aspects of the invention, a portable laser cleaning appliance can be adapted and constructed such that it only operates to clean the fabric material when oriented substantially horizontally. The portable laser appliance can be adapted and constructed for delivering a vapour to the fabric material. The vapour can comprise steam. The portable laser apparatus can be further adapted and constructed to deliver a liquid to the fabric material. The portable laser cleaning appliance can be adapted and constructed for removing creases or wrinkles from the fabric material. The portable laser cleaning appliance can include a heat source in thermal communication with the work surface wherein the appliance transfers thermal energy to the fabric material via conduction. The portable laser cleaning appliance can comprise a sole plate for ironing the fabric material for the removal or creases or wrinkles from the fabric material. A portable laser cleaning appliance can be adapted and constructed to prevent emanation of the optical energy from the aperture for cleaning unless the sole plate is positioned so as to be substantially horizontal. A portable laser cleaning appliance can be adapted and constructed to apply a vacuum to the fabric material. A portable laser cleaning appliance can be adapted and constructed to function as a vacuum cleaner for removing particular matter from the fabric material using airflow.

In additional aspects of the invention, the portable laser cleaning appliance includes the source of optical energy. The source of optical energy can be disposed within the appliance body. The source of optical energy can comprise a first source of optical energy that is separate from the appliance body, and the portable laser cleaning appliance can include a length of optical fiber in optical communication with the first optical source for delivering optical energy from the first source of optical energy to the appliance body. The first source of optical energy can comprise the source of optical energy. The first source of optical energy can comprises an optical pump source for optically pumping the source of optical energy. The source of optical energy is integral with the appliance body. The source of optical energy can comprise an optical amplifier for amplifying the optical energy.

In further aspects of the invention, the fabric material comprises a practical fabric material. The fabric material can comprise an article of clothing. The fabric material can comprise upholstery. The fabric material can comprise a rug. The selected contaminant can comprise an organic material. The selected contaminant can comprise an inorganic material. The portable laser cleaning appliance can be of a size and weight such that it can be readily spatially oriented in any direction with a single hand.

In other aspects of the invention, an optical parameter of the optical energy selected for contaminant removal can comprise a first wavelength of the optical energy, where the first wavelength is in the range of about 200 nm to about 750 nm. An optical parameter of the optical energy selected for contaminant removal can comprises a selected wavelength of the optical energy, where the selected wavelength is in the range of about 750 nm to about 2500 nm. An optical parameter selected for contaminant removal can comprise a first selected wavelength of the optical energy, where the first selected wavelength is in the range of about 2500 nm to 10,000 nm.

In more aspects of the invention, an optical parameter of the optical energy selected for contaminant removal can comprise the temporal characteristics of the optical energy. The optical energy can be emanated as substantially continuous wave (CW) optical energy. The optical energy can be emanated as repetitive bursts of CW optical energy or as CW optical energy can be emanated responsive to the user of the portable laser cleaning appliance. The optical energy can comprise pulses having a time duration of less than 1 picosecond. The optical energy can comprise pulses having a time duration of less than 100 picoseconds. The optical energy can comprise pulses having a time duration of less than 1 nanosecond. The optical energy can comprise pulses having a time duration of less than 10 nanoseconds. The optical energy can comprise pulses having a time duration of less than 100 nanoseconds.

An optical parameter of the optical energy selected for contaminant removal can comprise pulsing the optical energy to provide pulses having a pulse energy of more than 10 nanoJoules. An optical parameter of the optical energy selected for contaminant removal can comprise pulsing the optical energy to provide pulses having a pulse energy of more than 1 microJoule. An optical parameter of the optical energy selected for contaminant removal can comprise pulsing the optical energy to provide pulses having a pulse energy of more than 10 microJoules. An optical parameter of the optical energy selected for contaminant removal can comprise pulsing the optical energy to provide pulses having a pulse energy of more than 100 microJoules. An optical parameter of the optical energy selected for contaminant removal can comprise pulsing the optical energy to provide pulses having a pulse energy of more than 1 milliJoule.

The portable laser cleaning appliance can be adapted and constructed such that one or more of the optical parameters are selectable and changeable by the user of the laser cleaning appliance. However, such selection and change can also be an automated process.

As noted above, the invention can also include methods, some of which are now described in more detail.

In one aspect, a method of laser cleaning a material can comprise applying optical energy to fabric material, the optical energy having one or more optical parameters selected so as to remove a selected contaminant from the fabric material; and removing creases or wrinkles from the fabric material and/or assisting in the laser cleaning of the material. Removing the creases or wrinkles can comprise applying one or more of the following to the fabric material: a vapour; a liquid; mechanical pressure; or thermal energy to heat the fabric material. Aiding in the cleaning of the fabric material can comprise applying one or more of following to the fabric material: a vapour; a liquid; mechanical pressure; or thermal energy.

Regarding removing wrinkles or creases or aiding in cleaning, in various aspects of the invention any of the vapour, liquid, mechanical pressure or thermal energy can be applied alone or in any combination (e.g., vapour alone, liquid alone, mechanical pressure alone, or thermal energy alone; vapour and liquid; vapour and mechanical pressure; vapour and thermal energy; liquid and mechanical pressure; liquid and thermal energy; mechanical pressure and thermal energy; vapour, liquid and mechanical pressure; vapour, liquid and thermal energy; vapour, mechanical pressure and thermal energy; liquid, mechanical pressure and thermal energy; vapour, liquid, mechanical pressure, and thermal energy).

Regarding any of the foregoing, the application can be made in any order as part of the cleaning or wrinkle/crease removing process, including simultaneously with each other or with an application of the optical energy for cleaning or with an application being made before or after others or before or after an application of optical energy for cleaning.

Typically the thermal energy is applied via conduction, such as from a heated work surface in physical contact with the fabric material. The work surface can apply the mechanical pressure. However, radiation and convection are also within the scope of the invention.

In one aspect of the invention, removing creases or wrinkles from the fabric material and/or assisting in the laser cleaning of the material comprises removing creases or wrinkles. In another, removing creases or wrinkles from the fabric material and/or assisting in the laser cleaning of the material comprises assisting in the laser cleaning of the fabric material.

In additional aspects of the invention, applying one or more of a vapour; a liquid; mechanical pressure; or thermal energy to heat the fabric material comprises applying the vapour to the fabric material. The vapour can comprise steam. Applying one or more of a vapour; a liquid; mechanical pressure; or thermal energy to heat the fabric material can comprises applying the liquid to the fabric material. The liquid can comprise water. The liquid can comprise a detergent. The liquid can comprise a solvent selected to remove a contaminant from the fabric material.

In yet further aspects, other than ambient atmospheric pressure can be applied to the fabric material, such as less than ambient atmospheric pressure or more than ambient atmospheric pressure to the fabric material. The method can be practiced "blind", that is, wherein the area being cleaned with the optical energy is not visible while the optical energy is being applied to the area. The method can comprise slidingly contacting the fabric with a surface during the laser cleaning of the fabric material. The optical energy can be applied to the fabric material as a beam and the surface can substantially surround the beam.

The method can comprise ironing the fabric material and the application of any of the vapour, liquid, mechanical pressure or thermal energy can be part of the ironing process.

First and second are used herein as identifiers; the use of "first" does not necessarily mean there must be a "second", nor does the use of "second" mean there must be a "first".

Optical energy can be characterized by a number of optical parameters, and the portable laser cleaning apparatus can be adapted and constructed to provide optical energy having one or more of the parameters selected to remove a particular contaminant from a particular fabric material. Certain examples are given above. By way of further example and not limitation, useful optical parameters can include the spatial intensity profile or distribution of the optical energy (e.g., Gaussian, substantially flat topped, fluence, or other feature related to the a spatial intensity profile or distribution); spectral makeup (wavelength or wavelengths); the relative intensities of the spectral components; spectral bandwidth and any spectral chirp (the foregoing can typically be ascertained by spectral intensity profile of the optical energy); average power; temporal intensity profile (e.g., CW, pulsed, quasi CW, particular pulse train, or other type of temporal profile). Where the optical energy is pulsed, the parameters can include pulse energy, peak power, pulse duration, pulse shape (e.g., shape of the temporal intensity profile), repetition rate, duty cycle, as well pulse train characteristics (e.g., a pulse train of pulses having different optical parameters). The location of an image plane relative to the surface of the fabric material (e.g., above the surface, substantially at the surface, or below the surface) is yet another example of an optical parameter that can be selected.

Unless otherwise defined, time durations, such as pulsewidths, and bandwidths as specified herein are full width, half maximum (FWHM) time durations and bandwidths.

"Laser", as that term is used herein, can include a structure (e.g., a fibre laser) having a resonant cavity, a master oscillator power amplifier (MOPA) arrangement (e.g., diode oscillator with a fibre or bulk optic amplifier); a diode laser; an ASE source; or a supercontinuum source. A source of optical energy as referred to herein need not comprise a laser—a high power lamp may be suitable in certain practices of the invention, most likely with appropriate filtering to select desired wavelengths. A laser, however, is typically preferred, as lasers can more readily provide optical energy confined to a small space and therefore ensure a high optical intensity at the substrate (e.g., fabric material) for improved efficiency of the cleaning process.

"Fabric material" is typically (but need not be) a woven, knitted or felted material, and can include a textile. A fabric material may comprise textile fibers, such as, for example, one or more of (alone or in any combination) man-made fibres such as nylon, cellulose acetate, polyester and or naturally occurring fibres such as cotton and wool. A fabric material may be primarily for practical use. Such a fabric material is referred to herein as "practical fabric material" and includes, for example, articles such as clothing, rugs, upholstery, bed sheets, towels, wash cloths, table cloths, handkerchiefs, shower curtains, window drapes, pillow covers, and quilts, which are just some examples. As used herein the term "practical fabric material" is intended to exclude works of art intended substantially only for viewing (e.g., exclude the painted canvas of a framed picture).

A fabric material may be for sustained human contact, where sustained means not transient or unexpected or unusual. Typically expected and anticipated as usual by the designer or creator of the fabric. However, sustained human contact need not necessarily be continuous or by the same person, and not necessarily direct skin contact. For example, a rug is an example of a fabric that would receive sustained human contact, but typically by many different people and typically via their footwear. The painted canvas would typically not undergo sustained human contact. Most or many practical fabric material would undergo sustained human contact. Fabric materials can be conforming fabric materials—that is, they can comprise a flexible material that readily conforms to an object they are draped over or that is manufactured to conform to a subject of object (e.g., a shirt or a car cover).

"Blind as to the user" means that the when the portable cleaning appliance is in use to clean a workpiece, the area being cleaned by the optical energy is not under normal and anticipated use directly visible to the user of the appliance. "Directly visible" does not include video camera/screen arrangements (such are used in optical splicers, for example). Such arrangements do not provide for direct vision. The wearing of laser goggles to view a clearing process does, as the term is used herein, mean the process is directly visible. "Appliance" is used interchangeably with "apparatus" herein.

"Oriented substantially horizontally" means that the central axis of a beam of optical energy emanating from the portable laser cleaning appliance is substantially perpendicular to the horizontal plane (which is taken as level), that is, with about 15 degrees of the vertical axis that is perpendicular to the horizontal plane.

"Stray optical energy", as that term is used herein, refers to optical energy that propagates such that it can be incident on something other than the subject of the cleaning process (e.g., the fabric material), such as the user of the portable laser appliance, or a bystander. Stray optical energy is undesirable and can be created even when the portable laser cleaner is orientated such that the optical energy is directed at the fabric material. Creation of stray optical energy can involve one or more of a number of processes, such as scattering, reflection, refraction, or diffraction. In a perfect cleaning process (from the perspective of safety) no optical energy would emanate from the laser appliance except directly at the workpiece, and that optical energy would do its cleaning job without any creating any stray optical energy, so that no optical could be incident on the user or a bystander.

Several aspects of the invention are described above, in varying detail as to the features of each of the aspects. Any of the features of one of the aspects can be included as an additional or alternative feature of any of the other aspects, practices or embodiments of the disclosure described herein, except where clearly mutually exclusive with another feature of an aspect, practice or embodiment or where a statement is explicitly made herein that certain features will not work in such a combination. To avoid undue repetition and length of the disclosure, every possible combination is not explicitly recited. Furthermore, as the skilled worker can ascertain, a method of the present disclosure can comprise the steps relating to the function or operation of the features of apparatus and systems disclosed herein.

DETAILED DESCRIPTION

Figure 1:
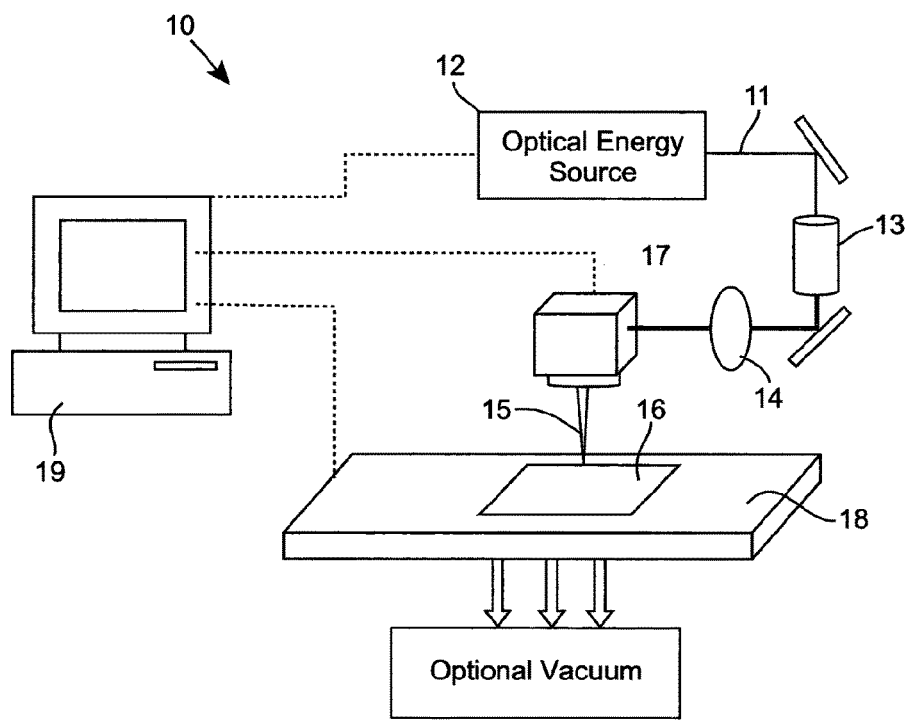
FIG. 1 schematically illustrates one embodiment of an apparatus according to the present invention for cleaning a substrate using optical energy from a laser whereby the beam and/or the substrate can be translated.

FIG. 1 illustrates one embodiment of an apparatus 10 for laser cleaning of a substrate, such as, for example, a practical fabric material. The apparatus 10 comprises an optical transmission pathway arranged for propagating optical energy received from source of optical radiation for emanation of the optical energy for the cleaning of the substrate, and which in the embodiment of FIG. 1 can comprise a beam expander, focussing lens and scanning head. For example, the optical output beam 11 from the source of optical energy, which preferably comprises laser source 12, is beam shaped using a beam expander 13 and focussing lens 14 into a focussed beam 15 at the surface of a substrate 16. The beam can be scanned over the substrate surface using a laser beam scan head 17 and the substrate can be scanned with respect to the focussed beam using an x-y or x-y-z axes translation stage 18. Typically the laser, scan head and translation stage are controlled by a computer 19 to determine the location, timing, and power level at which the laser radiation is delivered to the substrate. The beam 15 can be focussed to a small spot to enhance the optical intensity of the beam at the substrate surface, and scanned for cleaning a selected area of the surface of the substrate. In one example considered to effect cleaning of a fabric material, the laser source can comprise a pulsed fibre laser delivering short pulses of approximately 20 nanoseconds in duration at an average power of 20 W and pulse energy of up to 800 µJ at a wavelength of 1064 nm. The fabric material can be dampened with water to aid the cleaning process. The forgoing parameters of pulse time duration, average power, pulse energy and wavelength can be used in conjunction with any of other embodiments of the invention disclosed herein.

Figure 2:
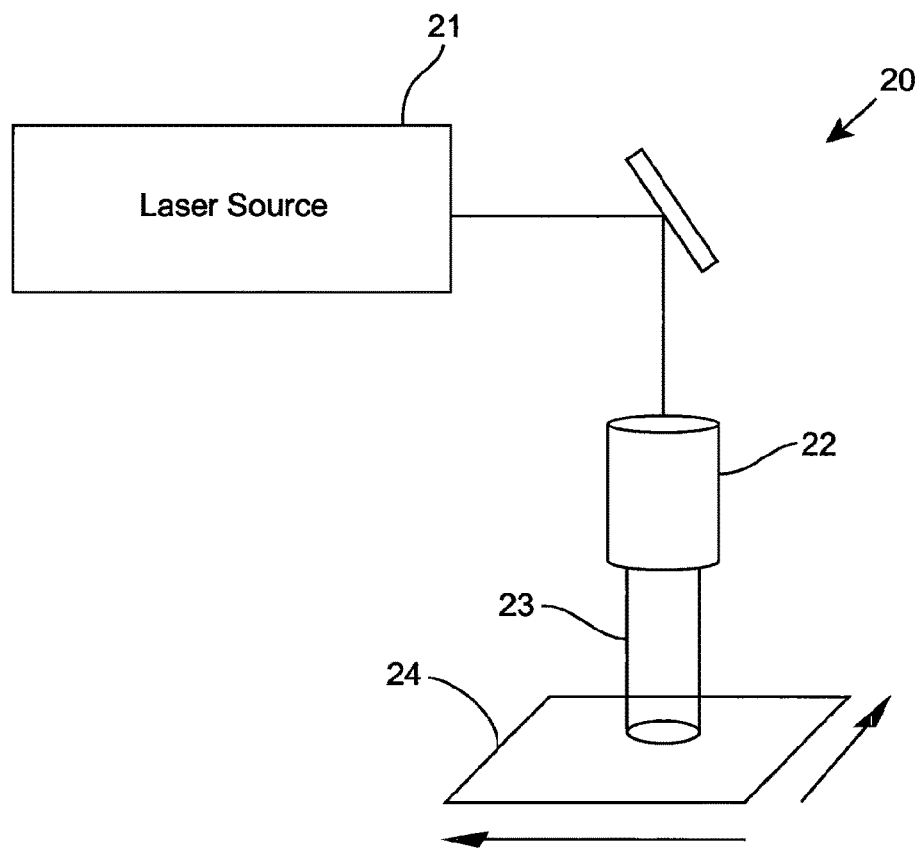
FIG. 2 schematically illustrates a configuration for beam shaping, suitable for use with any of the apparatus described or shown in the other FIGURES herein (except where clearly incompatible), whereby the beam is made into a large spot either through collimation or by diverging the beam. The large spot can provide a "flood" illumination covering a larger area of the substrate, spreading out the optical energy over a larger area.

FIG. 2 illustrates an apparatus 20 comprising a optical transmission pathway wherein the beam from a laser source 21 is shaped by beam shaping optics 22 into a larger beam or divergent beam 23 which becomes a large spot when incident on the substrate 24. Such illumination is often referred to as flood illumination, and the apparatus 10 can alternatively use such flood illumination in place of a focussed beam 15.

Figure 3:
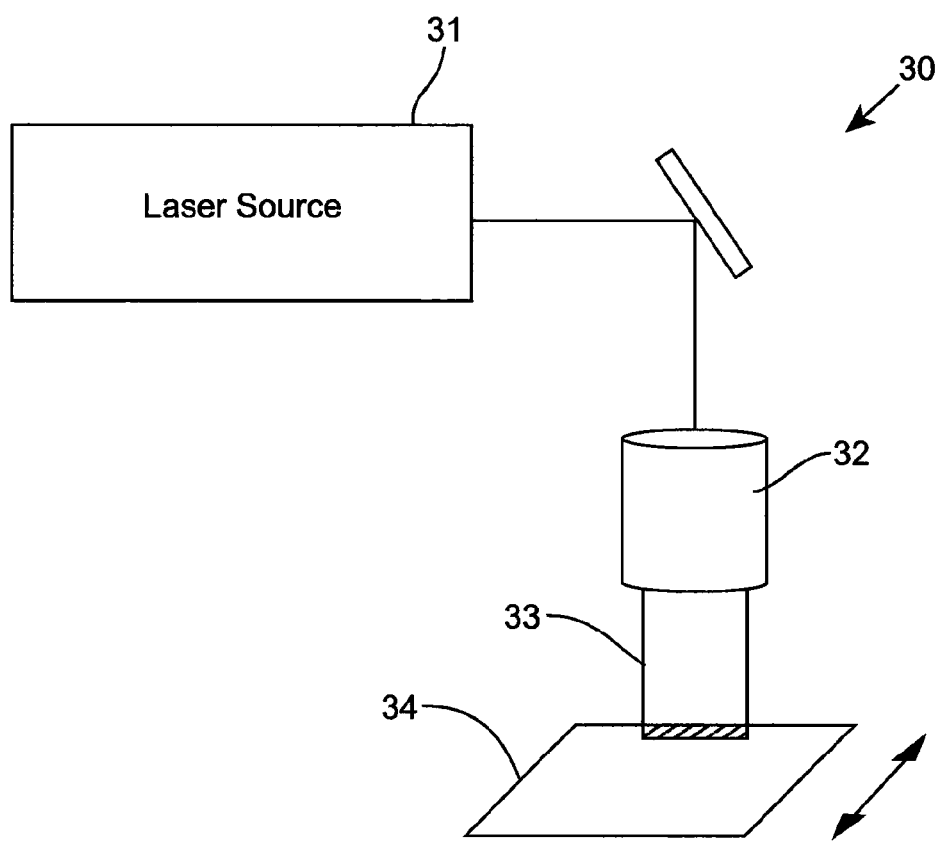
FIG. 3 schematically illustrates a configuration for beam shaping, suitable for use with any of the apparatus described or shown in the other FIGURES herein (except where clearly incompatible), wherein the optical beam is shaped into a thin stripe, allowing a large area coverage in one axis, yet maintaining a high intensity of the optical field in an orthogonal axis.

FIG. 3 illustrates another apparatus 30 which depicts an optical transmission pathway that involves the shaping of a laser beam 31 by beam shaping optics 32 in the form of a cylindrical lens into an elliptical beam with a very high degree of ellipticity such that the shaped beam 33 takes the form approximating a thin stripe of light when incident on the substrate 34. Such an illumination is often referred to as line illumination, and such line illumination can alternatively be used in apparatus 10 in place of the focussed beam 15.

Figure 4:
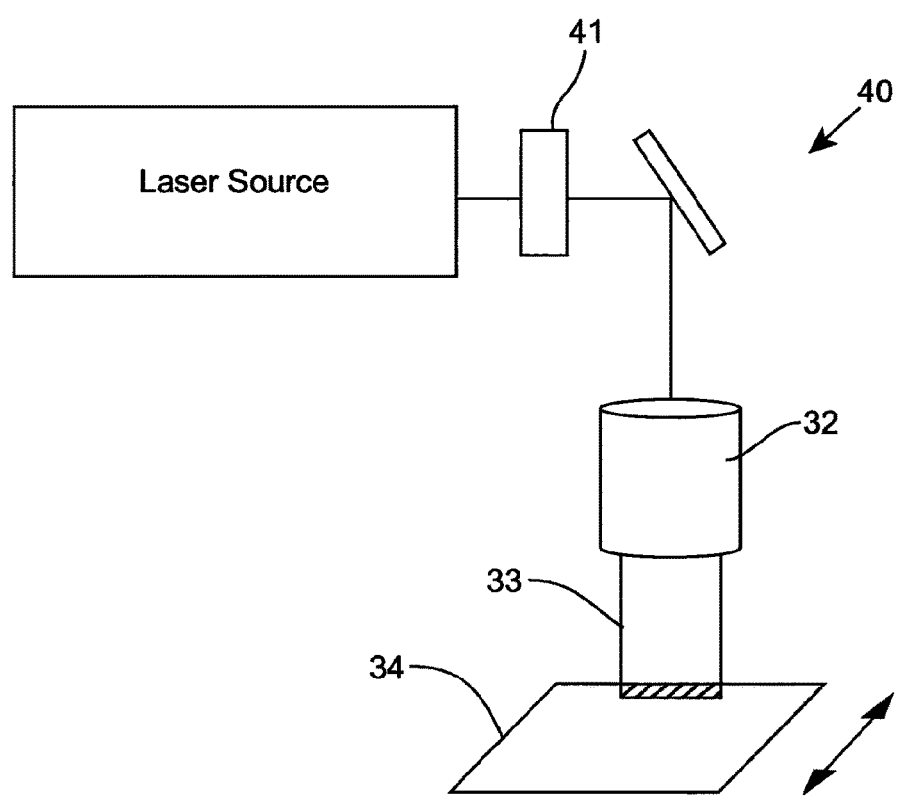
FIG. 4 illustrates a line-illumination system, suitable for use with any of the apparatus described or shown in the other FIGURES herein (except where clearly incompatible), with additional features to enhance the contaminant cleaning process, including modulation to enable pulsing or gating of the optical beam, wavelength filtration (in the case of a broadband or multi-wavelength light source) to optimise the optical wavelength for the specific contaminant or substrate, variable attenuator or power control of the light source output to control the rate of material removal or fluency of light at the substrate surface.

FIG. 4 illustrates the apparatus of FIG. 3 where the optical transmission pathway including additional features 41 enabling one or more additional controls of the source of optical energy (i.e., the laser) including modulation of the laser in time and power, and wavelength filtration of the laser (when integrated as a broadband or multi-line laser source) to deliver the optimum wavelength for efficient processing of different material substrates. The apparatus shown in FIG. 1 can be modified according to FIG. 4, and the apparatus of FIG. 1 so configured used to clean a fabric material.

Figure 5:
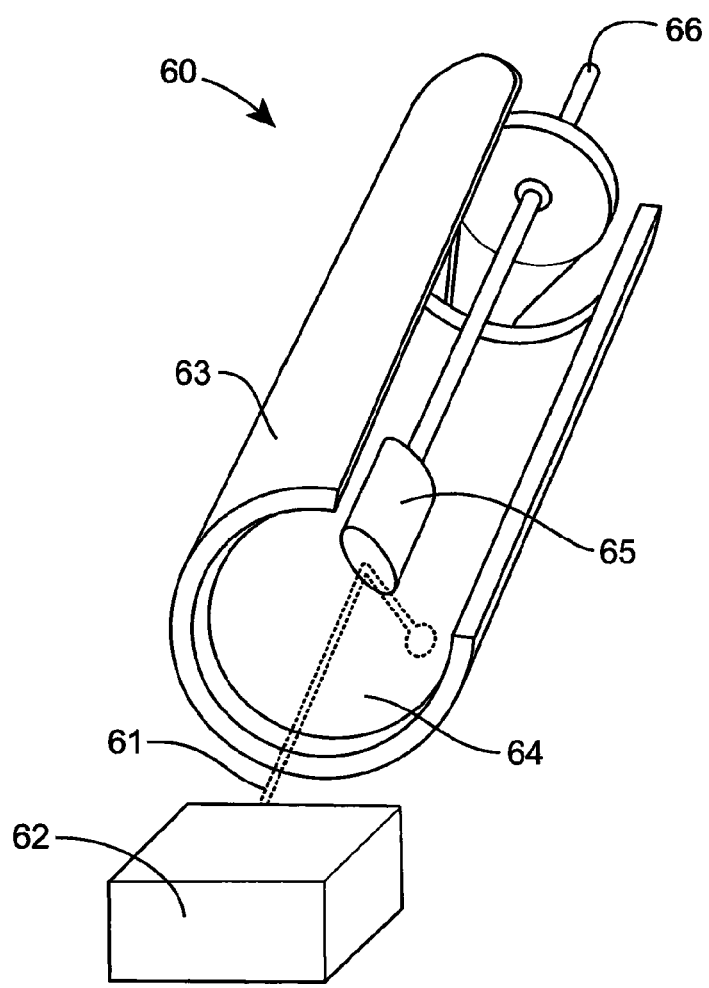
FIG. 5 schematically illustrates another embodiment of an apparatus for practicing the present invention, where the apparatus includes a rotating-drum concept similar to a conventional drum washing machine.

FIG. 5 illustrates another example of an embodiment of an apparatus 60 according to the present invention. In FIG. 5, the cleaning apparatus 60 is based around a drum arrangement. The drum can be stationary or can rotate. Here the optical transmission includes a spinning mirror. An optical beam 61 is delivered by a source of optical energy 62 along the central longitudinal axis of a drum 63, which can rotate around the longitudinal axis. The substrate to be cleaned 64 can be positioned flat on the internal surface of the rotating drum. This positioning can be attained through mechanical fixings or a suction mechanism within the drum (not shown in this FIGURE). Preferably the positioning of the substrate on the drum internal wall is attained through centrifugal forces as the drum rotates at high speed.

The spinning, scanning mirror 65 is mounted on a spindle 66 located on the central longitudinal axis of the drum, which can rotate. The optical beam is incident on the mirror which deflects the beam to be incident at the surface of the fabric material substrate on the internal drum wall. The rotation of the drum, spinning of the mirror and longitudinal translation of this mirror along the spindle over time results in the optical beam scanning the entire internal surface area of the rotating drum, attaining a complete coverage of the substrate within the drum, and cleaning the entire substrate. Repeat scans of the substrate surface can be attained by continual rotation of the drum, continual spinning of the mirror and continual translation of the mirror along the central spindle of the drum.

Further assistance to the cleaning process, as with all embodiments of the invention describe herein, can include the provision of suction to remove contaminants from the drum and substrate after being removed from the substrate, application of assistance mechanism; water, solvents, detergents, stain removers, steam, compressed gas etc. to the drum or locally as a nozzle, focussing the assistant mechanism to the incidence region of the optical beam.

The source of optical energy preferably comprises a laser. The laser can be selected on the basis of performance and cost and can be selected from a wide variety of laser types including, but not limited to, semiconductor diode lasers, fibre lasers, diode-pumped solid state lasers, gas lasers and combinations thereof. The laser source can deliver the laser light as continuous wave (CW), gated CW, pulsed or as bursts of pulses, said pulses being in the sub-picosecond, tens of picoseconds, sub-nanoseconds or greater than 1 nanosecond pulsed duration. The laser can deliver light in the infra red, near infra red, visible or UV region of the spectrum or can cover multiple regions of the spectrum as a continuous spectral band or a series of discrete wavelengths or wavelength bands. The laser, if of broadband spectral coverage, can include additional filtration to provide wavelength selection optimised to the contaminant and or substrate. These considerations can apply to all embodiments taught herein.

Figure 6:
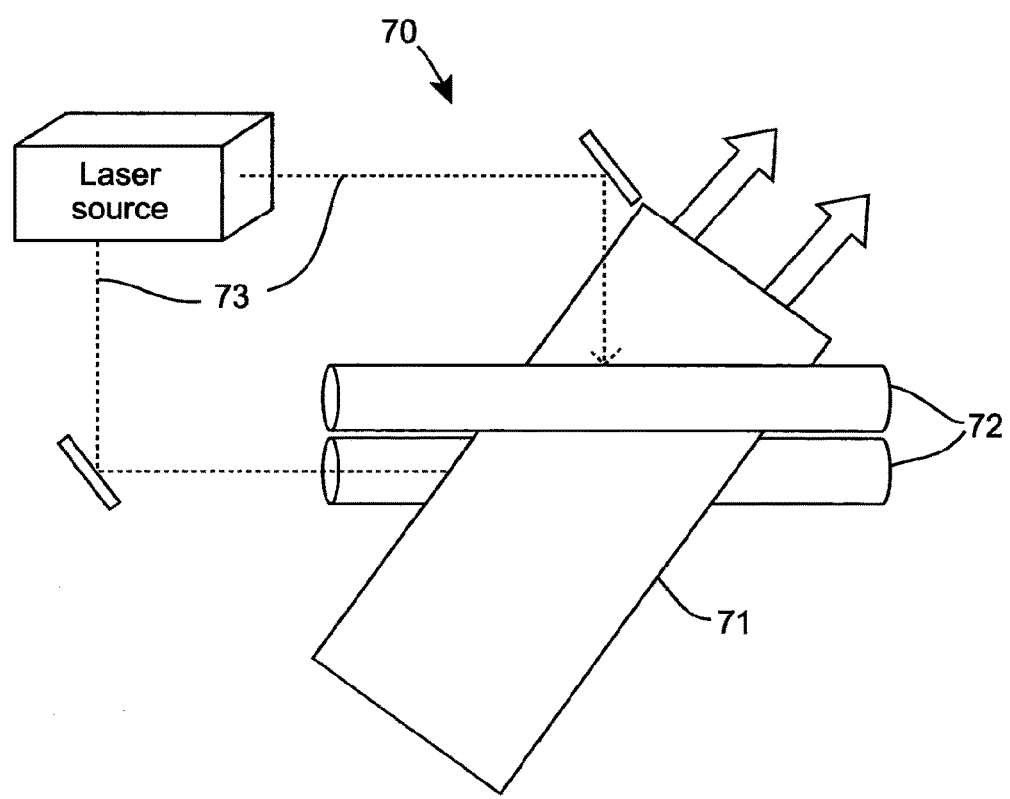
FIG. 6 schematically illustrates another embodiment of an apparatus for practicing the present invention including a "mangle-type" of design, whereby the substrate passes through the optical beam as a flat substrate.

FIG. 6 illustrates another embodiment of an apparatus 70 designed for the cleaning of substrate comprising contaminated fabric material. The optical transmission pathway includes a mangle type structure. The contaminated fabric to be cleaned 71 is passed through a mangle 72 which is adapted to pass one or more optical beams 73 from an optical source 74 and direct them onto one or more of the substrate surfaces as the substrate is passed and forced flat, translating through the mangle space in the mangle. Optical energy can be delivered from the top, bottom, or from both the top and bottom.

As described in conjunction with FIG. 5, the beam can be focussed to a small spot or shaped into a large spot on the substrate as a collimated or divergent beam. Alternatively, the beam can be shaped into a stripe at the surface of the substrate. The beam can be fixed in position or alternatively scanned by a beam scanner.

Figure 7:
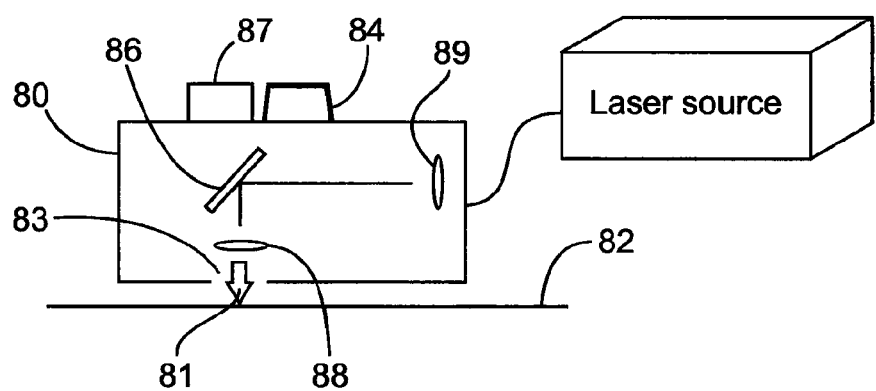
FIG. 7 schematically illustrates a further embodiment of an apparatus for practicing the present invention, wherein a beam of optical radiation is delivered to the substrate by a movable enclosure and where the source of optical energy is external to the enclosure with the optical energy delivered between the source and enclosure via an optical light guide.

FIG. 7 shows another embodiment of the cleaning apparatus for cleaning a substrate, such as a substrate comprising a fabric material, according to the present invention. In this embodiment, the cleaning apparatus is configured as a module or body 80 which can be moved with respect to the substrate, the module delivering the optical beam 81 to the substrate surface 82 preferably via aperture 83, which can comprise an optical window that is transmissive at the wavelength of the source of optical energy. In this specific exemplary embodiment, the source of optical energy is located external to the module 80 and optical energy from the optical source is delivered to the module by a light guide such as an optical fibre or light guide of the optical transmission pathway. The module can comprise the beam shaping optics 88, 89 and beam steering optics of the optical transmission pathway to focus or shape the beam to the desired parameters at the substrate surface. The beam shaping optics may produce a focussed beam, or line or broad area beam at the substrate surface. The beam steering optics may additionally comprise a scanning mirror 86 to scan the beam across the substrate surface such as to provide broad area scanned coverage of the substrate surface (such as by scanning a focussed spot over the substrate) and/or to prevent over exposure of a particular region of the substrate and the local build-up of heat due to locally-absorbed optical energy.

The module preferably also includes a mechanism for controlling (automated or manually through user adjustment via, for example, control panel 87) various parameters of the optical beam including, but not limited to, power, pulse duration, wavelength, pulse repetition rate and beam size.

The module can be moved around the substrate to produce wide-area coverage and cleaning of large regions of the contaminated substrate. The module can be moved by hand via a mounted handle 84 or could be mounted on a gantry or robot for more industrial, automated cleaning applications, for example in large pieces of professional cleaning equipment or within environments such as nuclear and chemical sites, where it is not possible for people to be present. The bottom of the module can comprise a work surface for contacting (e.g., slidingly contacting) the as the module is moved around during the cleaning process. The work surface can surround the aperture, as shown in FIG. 7.

Figure 8:
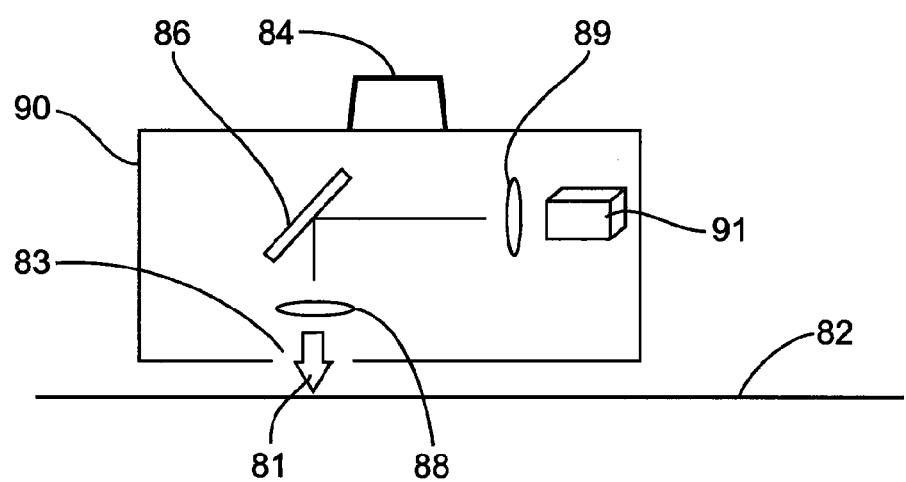
FIG. 8 schematically illustrates yet an additional embodiment of an apparatus for practicing the present invention, wherein a beam of optical energy can be delivered to the substrate by a movable enclosure and where the optical source is mounted within the enclosure.

FIG. 8 illustrates another embodiment of the present invention with the same features and variations as FIG. 7 with the difference that the optical source 91 is located within the module 90.

Figure 9:
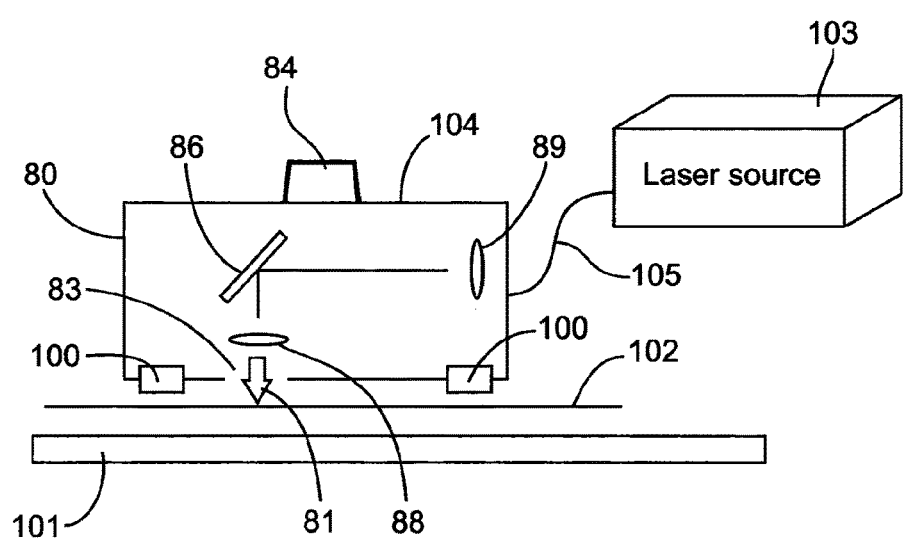
FIG. 9 illustrates the apparatus of FIG. 8, with further illustration of safety features to prevent accidental exposure of the optical beam to the user. Safety features can include a position sensor for interlocking the laser to only allow operation of the source of optical energy where there is no possible exposure to the user's skin and/or eyes.

FIG. 9 illustrates another embodiment of the present invention with the same features as FIG. 7 but with additional safety interlock features specifically shown by way of example (which features may apply as well to the embodiment of FIG. 8). In all embodiments of this invention, the optical source can be a laser source and, in any of the embodiments, the laser source can comprise a class 4 laser source requiring strict laser safety controls and appropriate interlocks. In order to utilise such a class 4 laser apparatus within a domestic and in many industrial environments, the system must be failsafe to ensure that the user cannot be exposed to the laser beam beyond those acceptable exposure limits as governed by laser safety standards. FIG. 9 gives an example of how this particular embodiment of the present invention might be implemented as a safe-to-use commercial appliance.

Referring to FIG. 9, one or more position sensors 100 on the bottom of the module or body 104 sense whether or not the module is flat against a surface preventing access to the light aperture of the module and exposure of the end user's skin or eyes to potentially harmful levels of optical radiation. The position sensors can be electrical, optical, magnetic, pressure or any other type of position sensor. Furthermore, to make the system failsafe, the module could be designed to only work on a given platform. For example, in an industrial machine, the base plate 101 on which the substrate 102 is mounted may be fabricated from a specific material or emit a specific frequency or optical wavelength that the position sensors 100 must detect in order of the source of optical energy 103 to operate. Typically, the laser source within a commercial system would have at least one interlock and preferably two interlocks, requiring, for example, all position sensors to detect that the module is flat against a surface and that the system is light tight, not allowing scattered optical radiation to exit from the module leading to potential user exposure. Only when position sensors are in place can the laser operate. In the specific example embodiment shown by FIG. 9, the light source 103 is located external to the module 104. In this case, additional protection would be required to detect a break in the optical delivery cable 105 with implementation of an interlock to shut down the optical source in the event of an output power failure due to optical cable break.

It will be appreciated that the examples shown in FIGS. 1 and 5-9 can implement other mechanisms to assist (the optical source) with the cleaning process. Such additional mechanisms can include, for example, the use of water to dampen the contaminated substrate, steam to provide heat, moisture and pressure to the cleaning process, vacuum or compressed air to provide removal of any removed contaminant particles through suction or by blowing the contaminant away from the substrate, chemicals including detergents, stain removers, anti-oxidants which provide a chemical reaction to assist the removal of the contaminant from the fibres of the substrate textile.

The modules shown in FIGS. 7-9 represent a cleaning tool for substrates, and in particular substrates comprising a fabric material, which can be hand held or mounted on an automated mount such as a gantry or robot.

FIGS. 10-15 show hand-held modules, such as those described above in FIGS. 7-9, with the modification that the modules are now further configured for as an iron, such as a steam iron for use, for example, in the domestic and commercial ironing of fabric materials. The "Light Iron" is hereby referred to as a LIRON for the purposes of this invention. FIGS. 10-15 show examples of how the cleaning apparatus can be combined with other mechanisms which assist with the cleaning process. FIGS. 10-15 further show how the laser cleaning apparatus can be designed to be combined with other functions such as crease or wrinkle removal, typically attained with a conventional iron, steam iron or steam generator iron.

A traditional iron or steam iron or more recently steam generator iron, is used to remove creases from fabric materials, most commonly clothing and household textiles including bed sheets, table cloths etc. Most commonly, the iron is in the form of a steam iron, including not only heat but also a water sprayer and source of steam to help with the ironing process. The steam iron uses superheated water to eliminate wrinkles in clothes and fabrics which may not be suitable for traditional dry ironing. Distilled water is usually poured into a holding tank and special heating elements convert it to steam. This hot mist comes out through a number of holes in the soleplate (bottom plate, which typically is heated by a source of thermal energy (e.g., an electric heating element) of the steam iron. As the steam loosens the individual fibers of the clothes, the steam iron's pressing action smoothes out wrinkles or creases.

Ironing is a process carried out typically after washing and drying fabric materials. It is an additional task in the home and is required in most cases to remove creases and wrinkles, though some "non-iron" fabrics are available where limited ironing is required.

FIGS. 10-15 show examples of a hand-held cleaning tool for fabrics (substantially similar to those shown in FIGS. 7-9, with the differences now shown or described). However, the invention described by way of example in FIGS. 10-15 also have the option to provide or enhance the function of crease or wrinkle removal in addition to the cleaning capability. In many cases, an item of clothing or a table cloth, bed sheet etc., might have very light soiling yet is cleaned on a regular basis. An example is a shirt worn by a typical office worker. This shirt may be worn once per day, after which it is cleaned in a conventional washing machine and then ironed to remove the creases. In actual fact, the shirt will have very minor amounts of dirt around the collar and cuffs, perhaps a localised food stain and regions of odour from the wearer's body. The abrasive washing nature of a conventional drum-machine is not required to clean this item of clothing, yet this is the only solution. The hand-held cleaning system shown by way of example in FIGS. 7-9 and the LIRON system shown by way of example in FIGS. 10-15 provides a tool to clean such items of clothing, to remove dirt, odours and stains and, if necessary, to achieve this process whilst simultaneously removing the creases from the textile (item of clothing).

Figure 10:
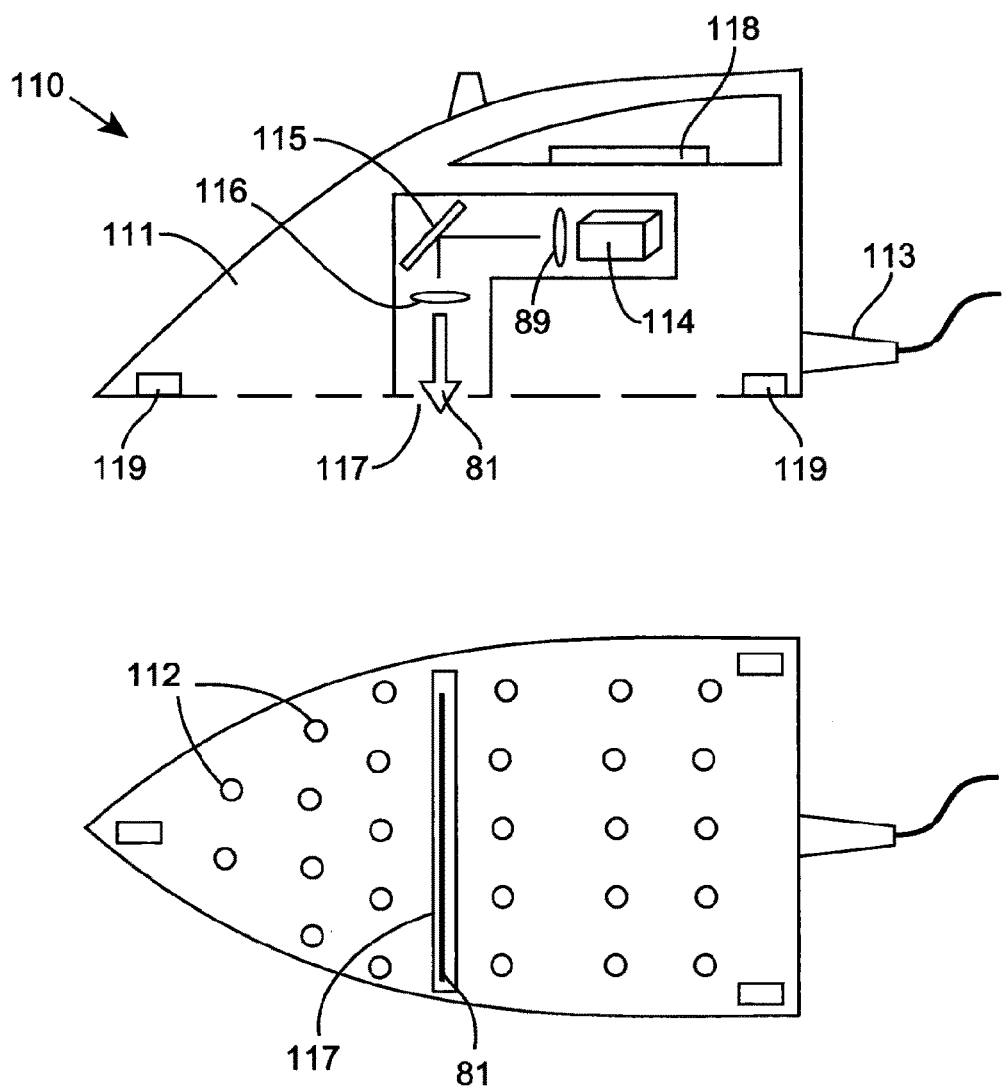
FIG. 10 schematically illustrates one embodiment of an apparatus for practicing the present invention in the form of a Light (or Laser) Iron (LIRON™)

Referring to the specific FIGURES and embodiments of the invention, FIG. 10 shows one such example of a handheld light cleaning apparatus implemented as a traditional steam iron. The LIRON 110 can comprise one or more of all the features of a traditional steam iron, including, but not limited to a body, a heat generator and heat control via thermostat and user control, steam generator and water reservoir 111, water sprayer, holes in the base 112 to allow steam to be directed onto the substrate textile, power cable 113 etc. The bottom surface of the base can be a work surface, such as work surface for slidingly contacting the fabric material during the cleaning thereof. In addition, the LIRON contains a source of optical radiation 114 and an optical transmission pathway between the source of optical energy and an aperture for emanating the optical energy for cleaning the substrate. The optical transmission pathway can comprise beam steering optics, 115, beam shaping optics 116 for conditional and propagating the optical energy to aperture 117, which can include a transmissive optical window. In this specific example, the beam shaping optics form the output of the source of optical energy into a narrow stripe covering the width of the optical window of the base of the apparatus. This apparatus would typically include power control of the light source as well as control of other features including the pulse duration or duration of optical bursts provided to the substrate, the duty cycle of these bursts and other parameters of the optical output which can help optimise the process of removing contaminants from the substrate textile. Such controls would preferable be available with easy access to the user of the apparatus. One possible implementation is shown in FIG. 10 as a knob on the LIRON. The specific control settings may be dependent on the type of fabric material and can be pre-set and calibrated such that the user simply sets the apparatus operating parameters dependent on the textile type (cotton, wool, synthetic etc.) and/or contaminant type (stain, blood, wine, oil, grease etc.). Also shown in FIG. 10 are a series of position sensors 119 which are used as a safety feature and are essential if the optical output of the apparatus exceeds the legal limits for safe human exposure. Such position sensors are linked to safety interlocks for the optical source and allow operation of the source only when the apparatus is in a safe position whereby no light leakage and optical exposure to the user is possible, as described in conjunction with FIG. 9.

Figure 11:
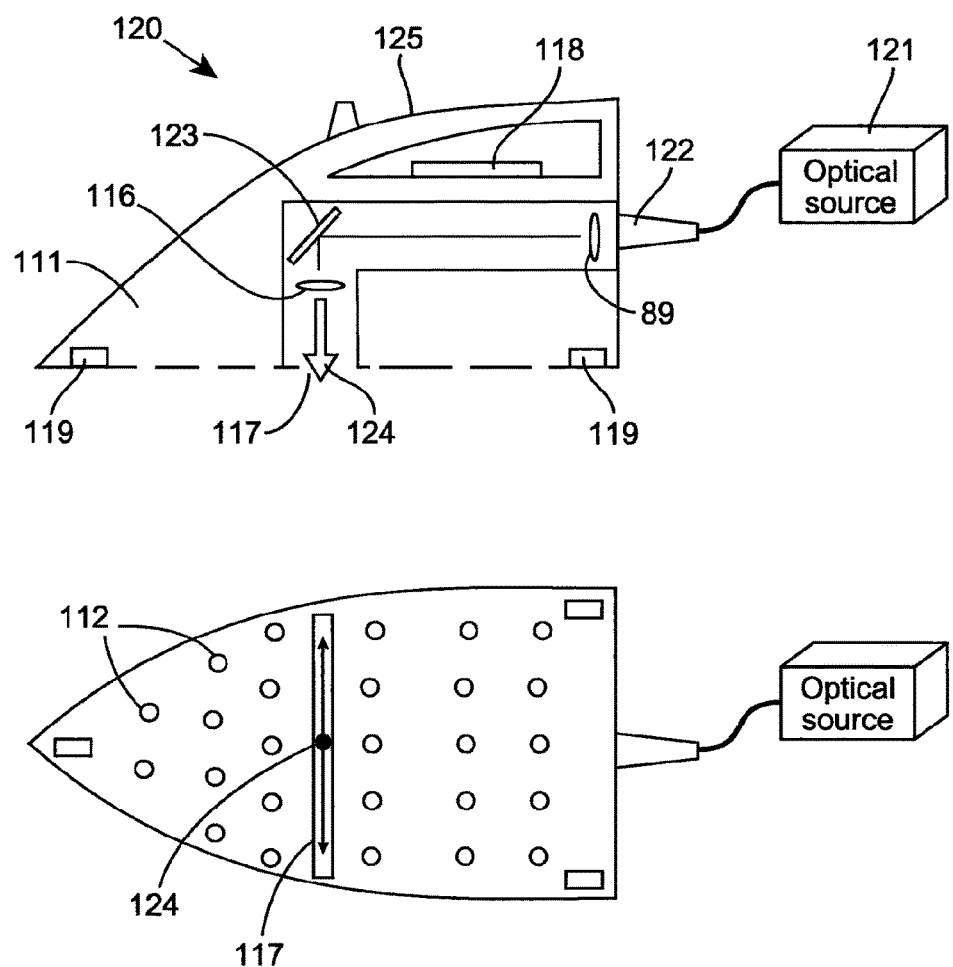
FIG. 11 schematically Illustrates another embodiment of the LIRON, with the source of optical energy mounted external to the LIRON and the beam being delivered to the hand held LIRON via optical cable. The beam in this example is shown as a focussed spot which can be fast-scanned horizontally over the width of the LIRON base or sole plate.

FIG. 11 schematically illustrates another embodiment of the LIRON, substantially similar to FIG. 10 except with the following differences. In this embodiment, the optical source (otherwise reference to herein as source of optical energy) 121 is positioned external to the apparatus body 120 with and the optical transmission pathway comprises a flexible optical light guide such as an optical fibre. Beam shaping optics 122 and beam steering optics 123 optimise the shape and position of the light beam at the output aperture on the base of the apparatus. In this example, the beam is focussed to a small spot 124 at the aperture to optimise the intensity of the beam at the substrate to be cleaned. The beam steering optics includes a scanner which scans the focussed beam from side to side along the light aperture window shown (by way of example only) as a thin window in this example. The scanning speed is preferably arranged to be fast such that the focussed spot does not dwell for a long period at any one spot, potentially leading to heat build-up locally in the substrate. The reservoir 111 can include compressed air or a pressurized aerosol.

Figure 12:
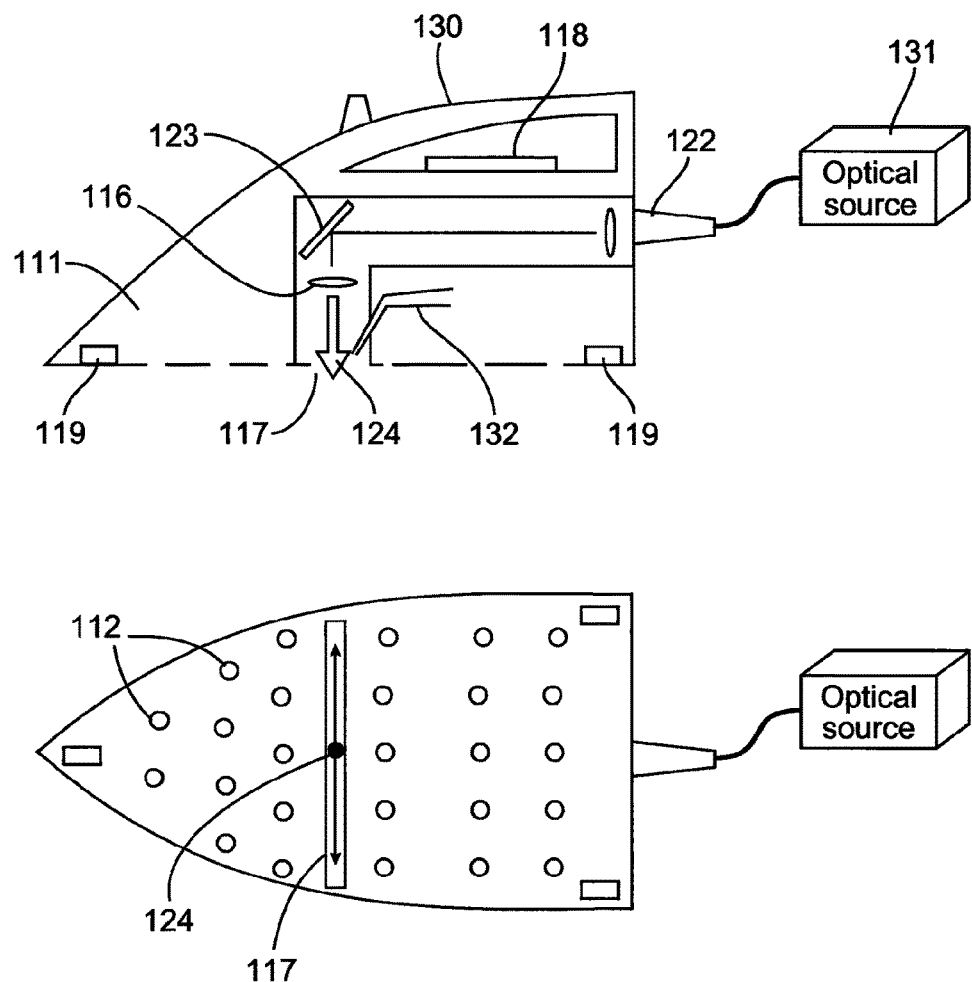
FIG. 12 schematically illustrates another embodiment of the LIRON apparatus, similar to that of FIG. 11, where the LIRON is adapted and constructed for providing steam, water, or air to the substrate exposed to the optical energy. Delivery of steam, air, etc. can assist in the removal of the contaminant from the substrate, and can be simultaneous with, or before or after, an application of cleaning optical radiation to the substrate.

FIG. 12 schematically illustrates another embodiment of the LIRON, which can be substantially similar to FIG. 11 with the differences now described. In this example, the optical source 131 is also positioned external to the apparatus 130 with the light delivered to the apparatus by a flexible optical light guide such as an optical fibre. It will be appreciated that the optical source could be equally positioned within the apparatus, as shown in FIG. 10. The apparatus is identical to the example embodiment of FIG. 11 with the addition that there is a provided a mechanism such as a nozzle 132 for directing steam (this could also be water, air, gas, detergent, stain remover or other assistant mechanism for the optical cleaning process) locally at the substrate where the optical beam is incident at the substrate. The locally focussed steam or gas can assist in the removal of contaminant from the textile by providing thermal energy to the process or simply by applying a pressure to "blow-away" contaminant particles removed from the textile fibres by the optical source. The reservoir 111 can include compressed air or a pressurized aerosol.

Figure 13:
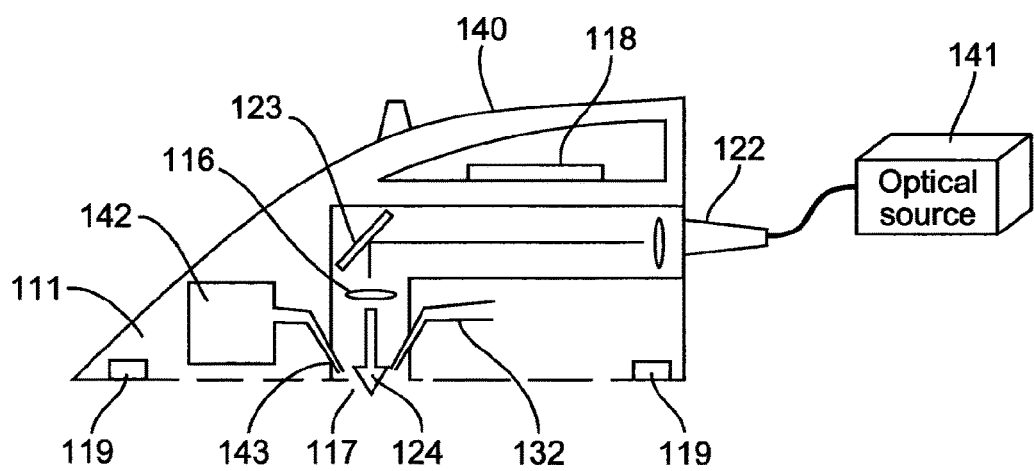
FIG. 13 schematically illustrates yet another embodiment of a LIRON apparatus for practicing the present invention, where the LIRON includes a suction pump or vacuum to assist in the removal of contaminant from the substrate and the suction or vacuum pump may be integral with the LIRON apparatus.

FIG. 13 shows yet a further example embodiment of the LIRON apparatus, again with the optical source 141 external to the apparatus (and again the source of optical energy can be included within the body, as shown in FIG. 10). The apparatus of FIG. 13 is identical to that shown in FIG. 12 with the addition of a vacuum or suction pump 142 within the apparatus, such suction being directed by a nozzle 143 locally to the substrate in the region where the optical beam removed contaminants from the substrate. The suction pump serves to extract debris contaminants from the substrate once removed or dislodged from the textile fibres by the optical beam and any assistant mechanism. The reservoir 11 can include compressed air or a pressurized aerosol.

Figure 14:
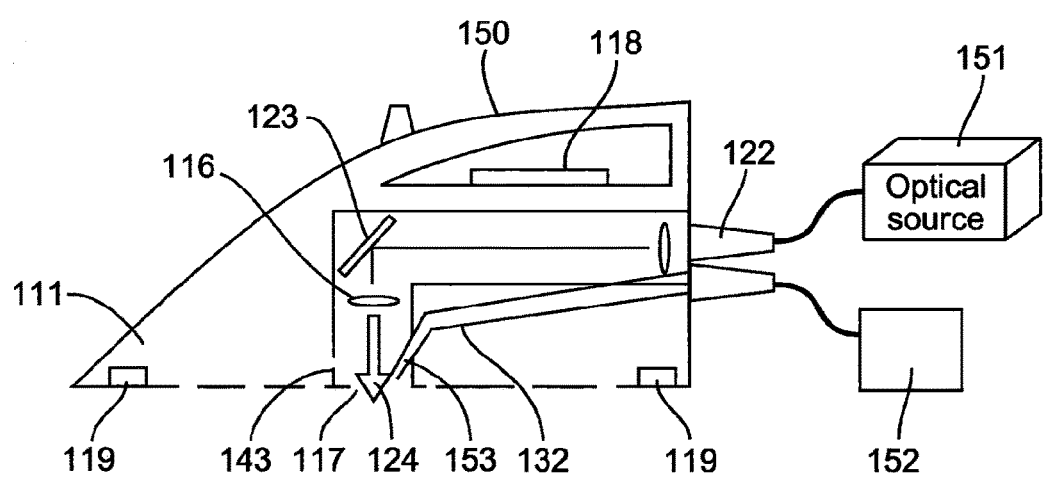
FIG. 14 schematically illustrates another embodiment of a LIRON apparatus, in this instance including an external suction pump or vacuum to assist in the removal of contaminant from the substrate.

FIG. 14 shows yet another embodiment of the present invention, again with the optical source 151 mounted external to the LIRON apparatus (and again it could be inside). In this example, the vacuum or suction pump and/or the source of assistant mechanism (steam, gas, detergent, stain remover etc.) 152 are also mounted external to the apparatus and directed to the region of the optical beam, shown in FIG. 14, by a nozzle 153. The reservoir 111 can include compressed air or a pressurized aerosol.

Figure 15:
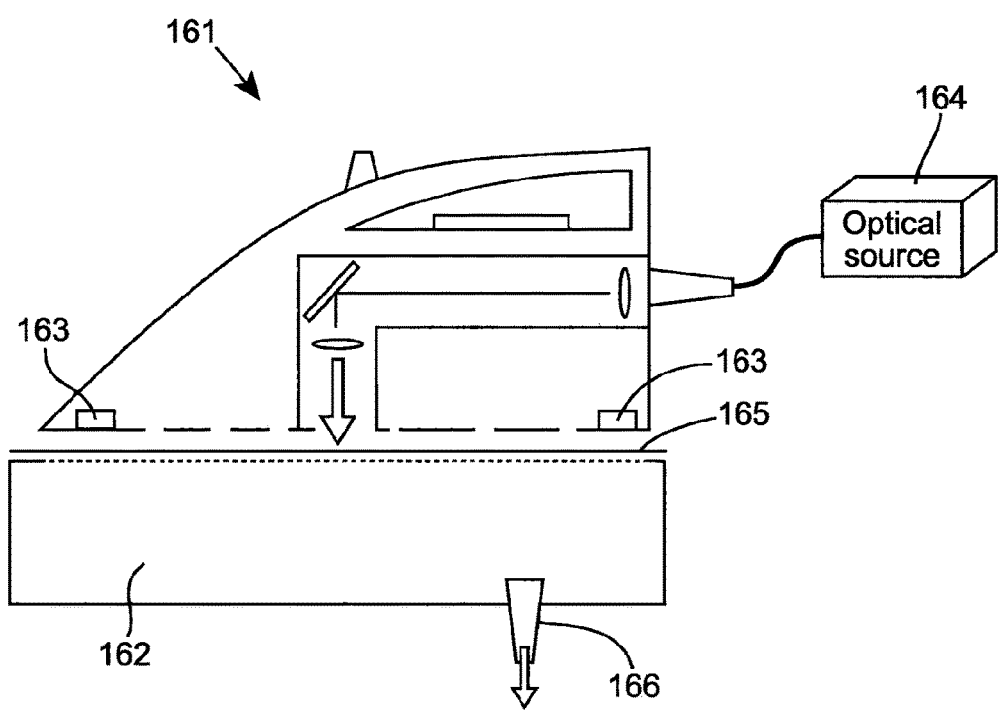
FIG. 15 schematically illustrates another embodiment of a LIRON apparatus according to the present invention, where the LIRON is provided with a dedicated LIRON Board similar to an ironing board onto which the substrate (e.g., fabric material) can be positioned during the ironing process. The board can include a suction or vacuum pump and perforated substrate mounting surface such that suction can be provided to the substrate to assist in removal of contaminants from the surface as well as aid in maintaining the substrate in place on the board.

FIG. 15 shows yet another embodiment of the present invention. The apparatus handheld cleaning device 161 can be in the form of any of the embodiments of this invention. In addition to the handheld apparatus, there is provided a specific base 162 which partners with the handheld or gantry mounted apparatus for cleaning. The base can be simple like a conventional ironing board used in domestic ironing processes. The base can contain other features which make up the entire cleaning and/or ironing system. For example, the base can be designed to enable the position sensors 163 and interlock system by containing part of the sensing system such that the apparatus optical source 164 can only operate when the apparatus is in position on the specific base. The position sensor could, for example, comprise an optical or electrical transmitter-detector pair, with one of the transmitter and detector being positioned within the base whilst the other remains with the hand-held cleaning apparatus.

The base 162 of FIG. 15 can further comprise a suction pump 166 which serves to remove debris from the textile having been cleaned by the hand held cleaning apparatus. The suction pump also can provide a means for ensuring that the textile substrate 165 is flat against the top surface of the base. The suction pump 166 can be external to the base 162 or built into the base 162.

Figure 16:
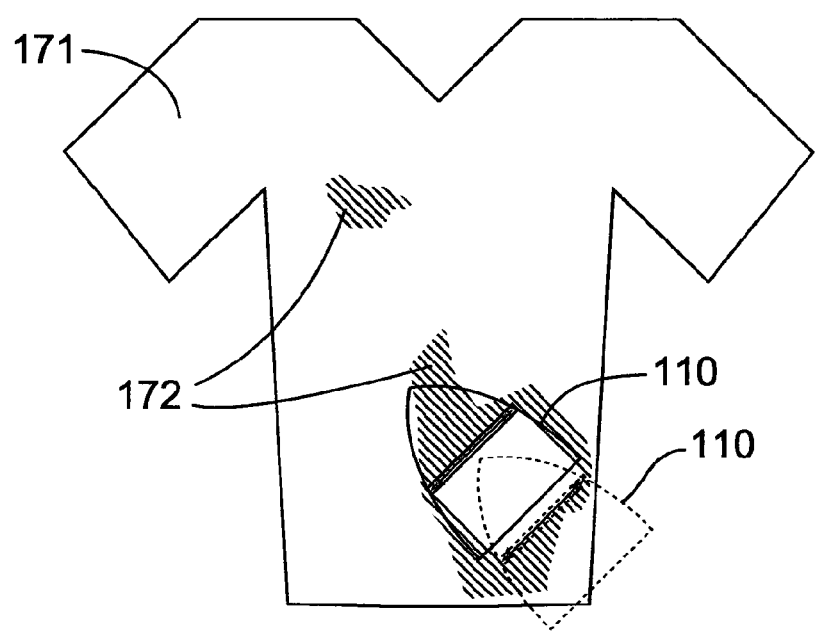
FIG. 16 illustrates another embodiment of an apparatus for practicing the present invention. The apparatus can include a "flatbed" design and an integral source of optical energy and a scanner unit which translates a beam through a transparent window to the surface of the substrate mounted on top of the transparent window. The apparatus can include a hinged lid that provides a light tight seal whilst also helping to maintain the substrate in flat contact with the transparent window.
Figure 17:
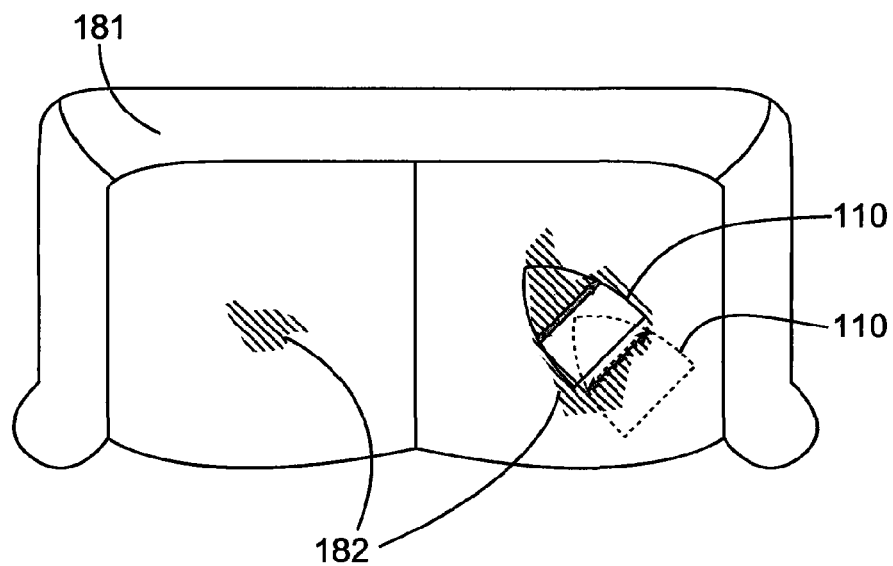
FIG. 17 illustrates another embodiment of an apparatus for practicing the present invention, wherein the substrate to be cleaned can be mounted vertically or horizontally, and the beam from the source of optical radiation can be scanned across the surface of the substrate through translation of the laser beam and/or optical source. The apparatus of FIG. 17 can be useful for industrial cleaning systems whereby large-area, flat substrates, such as sheets of material, are to be cleaned.

FIGS. 16 and 17 show example uses of a hand-held cleaning and hand-held cleaning/ironing (LIRON) apparatus in the cleaning of fabric materials. FIG. 16 uses the case example of a clothing garment 171, whilst FIG. 17 uses an example of a textile covered (e.g., upholstered) piece of furniture 181. In both cases, the substrate has areas contaminated with dirt, stains, odours etc. 172, 182. As the optical cleaning apparatus is scanned over the sample, the apparatus removes contaminant particles from the textile fibres providing a cleaning process. Equally, for the LIRON, the apparatus also provides the additional functionality of crease removal.

Figure 18:
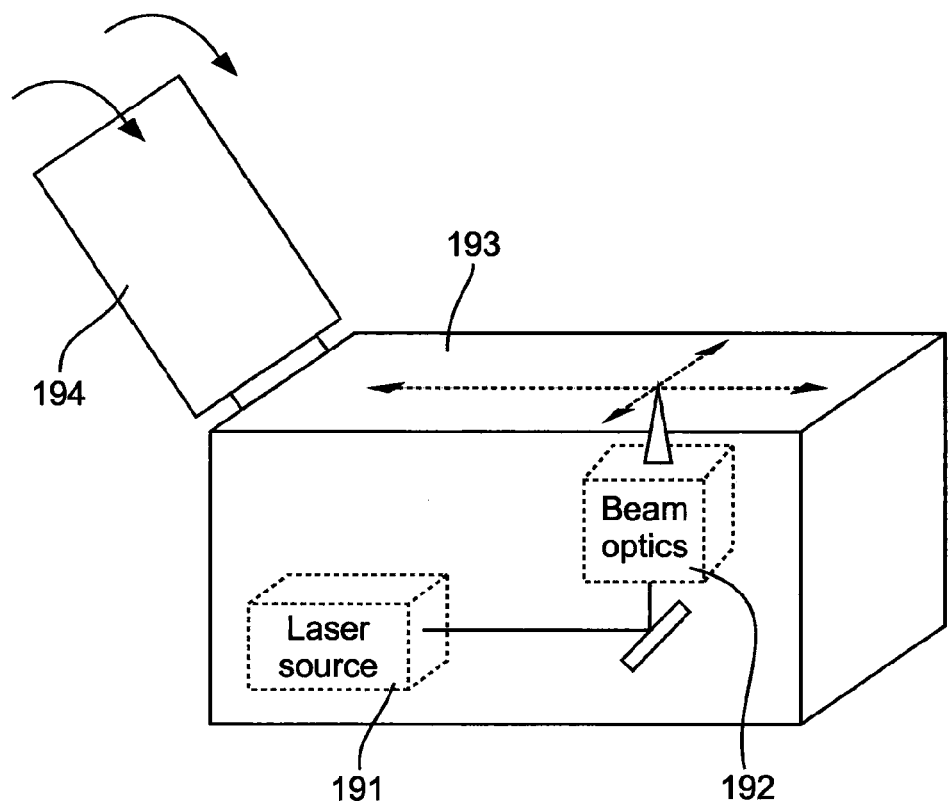
FIG. 18 illustrates an example of a method of cleaning a substrate comprising a fabric material (depicted in FIG. 18 as an item of clothing) according to an embodiment of the invention, which can be practiced, for example, using the apparatus shown in FIGS. 11-16.

FIG. 18 shows another example embodiment of an optical cleaning apparatus based on a design similar to a flat-bed scanner or photocopier. In this example embodiment, the optical source 191, and beam steering and beam shaping optics 192 of the optical transmission pathway can be within an enclosure. The beam is directed upwards to the upper surface of the apparatus which is configured as an optically transmissive window 193. In this example, the beam is focussed to a spot at a point just above the window surface onto which the textile substrate can be placed flat, such that the beam is focussed on the textile substrate. Equally the beam could be in the form of a large spot for flood illumination or a stripe. The beam is scanned across the surface of the transmissive window such that the surface of the textile substrate is fully exposed to the beam during the scan process.

The apparatus includes a lid 194 which, when closed onto the fabric material, sandwiches the material flat against the transmissive window. The lid can also act to form a light-tight seal and provide the appropriate interlock safety features for, for example, systems where the potential optical exposure exceeds acceptable safety limits. Further, the lid can also provide suction, steam, water, gas, detergent, stain removal and any other form of cleaning assistance.

Figure 19:
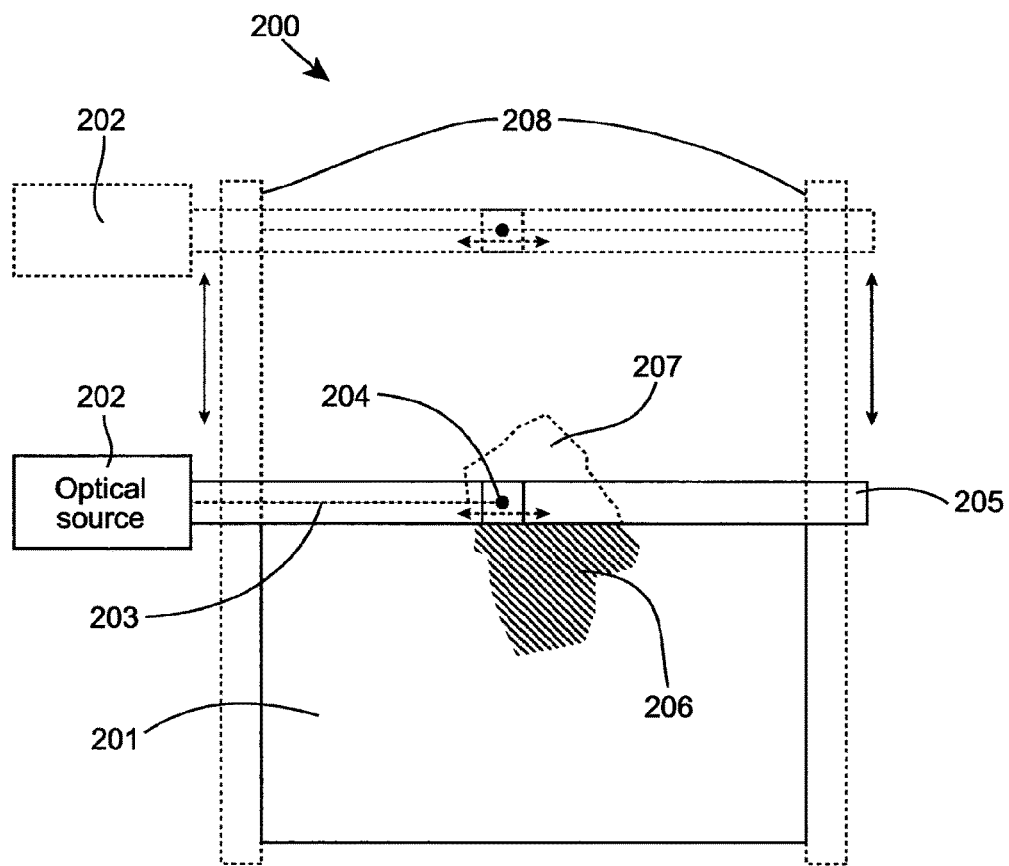
FIG. 19 illustrates another embodiment of a method of cleaning a substrate comprising a fabric material, (depicted in FIG. 19 as an item of furniture) according to an embodiment of the invention, which can be practiced, for example, using the apparatus shown in FIGS. 11-16.

FIG. 19 shows another example apparatus according to another embodiment of the present invention. This apparatus 200 is suited to large area cleaning within, for example, industrial-scale cleaning process. In this apparatus, the substrate to be cleaned 201 is positioned flat and held in position. The apparatus includes an optical source 202 which provides an optical beam 203 which is beam shaped and directed onto the substrate by a beam steering optic 204. In this example embodiment, the beam steering optic is on a translation stage 205 which traverses horizontally across the substrate. The entire module of the optical source, translation stage and beam steering/shaping optic is also movable and traverses vertically (as shown in this specific example) such that the optical beam can cover the entire surface of the textile substrate to remove contaminants from contaminated regions of the substrate 206 to make the area clean 207.

It will be appreciated that apparatus of FIGS. 18 and 19 can also include safety features (not shown). It will also be appreciated that the apparatus of FIGS. 18 and 19 can also include additional mechanisms for improving the cleaning process such as the use of steam, gas, detergents, vacuum or suction, stain removers and other types of cleaning assistance mechanism, as described in conjunction with other embodiments herein.

It will be appreciated that the specific orientations used within these FIGURES to demonstrate the apparatus functionality are by way of example only.

The present disclosure is directed to each individual feature, system, material, and/or method described herein. In addition, any combination of two or more such features, systems, materials, and/or methods, if such features, systems, materials, and/or methods are not mutually inconsistent, is included within the scope of the present invention. To avoid undue repetition, not all features are discussed in conjunction with every aspect, embodiment or practice of the disclosure. Features described in conjunction with one aspect, embodiment or practice are deemed to be includable with others absent mutual inconsistency or a clear teaching to the contrary. In some instances, features will be discussed generally rather than in detail in conjunction with a specific aspect, embodiment or practice, and it is understood that such features can be included in any aspect, embodiment or practice, again absent mutual inconsistency or a clear teaching to the contrary.

Those of ordinary skill in the art will readily envision a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teachings of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims, and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure § 2111.03, $8^{th}$ Edition, Revision 8. Furthermore, statements in the specification, such as, for example, definitions, are understood to be open ended unless otherwise explicitly limited.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; A & B; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red. Similarly, the recitation that "each of a plurality" of widgets is colored red shall also not mean that all widgets of an apparatus that has more than two red widgets must be red; plurality means two or more and the limitation reads on two or more widgets being red, regardless of whether a third is included that is not red, absent more limiting explicit language (e.g., a recitation to the effect that each and every widget of a plurality of widgets is red).

What is claimed is:

1. Portable laser cleaning appliance, comprising:
an appliance body comprising an aperture for emanating optical energy for cleaning;
an optical transmission pathway arranged for propagating optical energy received from a laser to said aperture for emanation of the optical energy for the cleaning;
said portable laser cleaning appliance being adapted and constructed so as to be hand held and for cleaning a fabric material, including cleaning by emanating from the aperture the optical energy having one or more optical parameters selected so as to remove a selected contaminant from the fabric material;
wherein the portable laser cleaning appliance includes a work surface arranged such that said work surface is in physical contact with the fabric material during cleaning and the cleaning is blind as to a user holding the laser cleaning appliance in their hand for cleaning.

2. A portable laser cleaning appliance according to claim 1 wherein said portable laser cleaning appliance is adapted and constructed for removing creases or wrinkles from the fabric material.

3. A portable laser cleaning appliance according to claim 1 wherein the portable laser appliance is further adapted and constructed for delivering a vapour to the fabric material.

4. A portable laser cleaning appliance according to claim 3 wherein the vapour comprises steam.

5. A portable laser cleaning appliance according to claim 1 wherein the portable laser cleaning appliance is further adapted and constructed to deliver a liquid to the fabric material.

6. A portable laser cleaning appliance according to claim 1 wherein the portable laser cleaning appliance comprises a heat source in thermal communication with the work surface wherein the appliance transfers thermal energy to the fabric material via conduction.

7. A portable laser cleaning appliance according to claim 1 comprising a sole plate for ironing the fabric material for said removal of creases or wrinkles from the fabric material.

8. A portable laser cleaning appliance according to claim 1 wherein said appliance body is of a size and weight such that it can be readily spatially oriented in any direction with a single hand.

9. A portable laser cleaning appliance according to claim 1 where an optical parameter of the optical energy selected for contaminant removal comprises a first wavelength of the optical energy, the first wavelength being in the range of about 200 nm to about 750 nm.

10. A portable laser cleaning appliance according to claim 1 wherein an optical parameter of the optical energy selected for contaminant removal comprises a selected wavelength of the optical energy, the selected wavelength being in the range of about 750 nm to about 2500 nm.

11. A portable laser cleaning appliance according to claim 1 wherein an optical parameter of the optical energy selected for contaminant removal comprises the temporal characteristics of the optical energy, the optical energy being delivered to the fabric material as repetitive bursts of CW optical energy or as CW optical energy delivered responsive to the user of the portable laser cleaning appliance.

12. Portable laser cleaning appliance, comprising:
an appliance body comprising an aperture for emanating optical energy for cleaning;
an optical transmission pathway arranged for propagating optical energy received from an optical energy source to said aperture for emanation of the optical energy for the cleaning;
said portable laser cleaning appliance being adapted and constructed so as to be hand held and for cleaning a fabric material, including cleaning by emanating from the aperture the optical energy having one or more optical parameters selected so as to remove a selected contaminant from the fabric material;
wherein the portable laser cleaning appliance includes a work surface arranged such that said work surface is in physical contact with the fabric material during cleaning;
wherein the optical energy source includes a laser; and
wherein the portable laser cleaning appliance comprises a heat source in thermal communication with the work surface wherein the appliance transfers thermal energy to the fabric material via conduction.

13. A portable laser cleaning appliance according to claim 12 wherein the appliance is further arranged and constructed such that the cleaning with the optical energy is blind as to the user holding the laser cleaning appliance in their hand for cleaning.

14. A portable laser cleaning appliance according to claim 12 wherein the portable laser appliance is further adapted and constructed for delivering a vapour to the fabric material.

15. A portable laser cleaning appliance according to claim 14 wherein the vapour comprises steam.

16. A portable laser cleaning appliance according to claim 12 wherein the portable laser cleaning appliance is further adapted and constructed to deliver a liquid to the fabric material.

17. A portable laser cleaning appliance according to claim 12 wherein said portable laser cleaning appliance is adapted and constructed for removing creases or wrinkles from the fabric material, comprising a sole plate for ironing the fabric material for said removal of creases or wrinkles from the fabric material.

18. A portable laser cleaning appliance according to claim 12 wherein said appliance body is of a size and weight such that it can be readily spatially oriented in any direction with a single hand.

19. A portable laser cleaning appliance according to claim 12 where an optical parameter of the optical energy selected for contaminant removal comprises a first wavelength of the optical energy, the first wavelength being in the range of about 200 nm to about 750 nm.

20. A portable laser cleaning appliance according to claim 12 wherein an optical parameter of the optical energy selected for contaminant removal comprises a selected wavelength of the optical energy, the selected wavelength being in the range of about 750 nm to about 2500 nm.

* * * * *